(12) United States Patent
Howard (10) Patent No.: US 12,095,506 B2
(45) Date of Patent: Sep. 17, 2024

(54) TIME-SLICED GMP MAPPING WITH MODIFIED SIGMA-DELTA MAPPING FUNCTION

(71) Applicant: Ciena Corporation, Hanover, MD (US)

(72) Inventor: Jamie Lynn Howard, Fairport, NY (US)

(73) Assignee: Ciena Corporation, Hanover, MD (US)

( * ) Notice: Subject to any disclaimer, the term of this patent is extended or adjusted under 35 U.S.C. 154(b) by 212 days.

(21) Appl. No.: 17/851,811

(22) Filed: Jun. 28, 2022

(65) Prior Publication Data

US 2023/0421264 A1 Dec. 28, 2023

(51) Int. Cl.
*H04B 10/27* (2013.01)
*G06F 13/40* (2006.01)

(52) U.S. Cl.
CPC ............. *H04B 10/27* (2013.01); *G06F 13/40* (2013.01); *G06F 2213/40* (2013.01)

(58) Field of Classification Search
CPC ...... H04B 10/27; G06F 13/40; G06F 2213/40
USPC .......................................................... 398/115
See application file for complete search history.

(56) References Cited

U.S. PATENT DOCUMENTS

| | | | |
|---|---|---|---|
| 8,867,913 B2 | 10/2014 | Gareau et al. | |
| 8,982,910 B1 * | 3/2015 | Zhang | H04L 49/00 370/503 |
| 9,019,997 B1 * | 4/2015 | Mok | H04Q 11/04 370/503 |
| 9,264,139 B2 | 2/2016 | Young et al. | |
| 9,374,166 B2 | 6/2016 | Mateosky et al. | |
| 9,917,668 B2 | 3/2018 | Juneja et al. | |
| 10,218,823 B2 | 2/2019 | Gareau | |
| 10,225,037 B2 | 3/2019 | Gareau | |
| 10,257,596 B2 | 4/2019 | Swinkels et al. | |
| 10,396,972 B1 | 8/2019 | Gareau et al. | |

(Continued)

FOREIGN PATENT DOCUMENTS

| | | | | |
|---|---|---|---|---|
| CN | 101489157 A | * | 7/2009 | ............ H04J 3/0647 |
| CN | 103825668 A | * | 5/2014 | |

(Continued)

OTHER PUBLICATIONS

International Telecommunication Union, ITU-T, G.709/Y.1331, "Interfaces for the optical transport network," Jun. 2020, pp. 1-280.

(Continued)

*Primary Examiner* — Abbas H Alagheband
(74) *Attorney, Agent, or Firm* — Baratta Law PLLC; Lawrence A. Baratta, Jr.

(57) ABSTRACT

A circuit includes an input configured to receive a plurality of client signals; a generic mapping procedure (GMP) block configured to map each of the plurality of client signals into a corresponding server signal; and a time-sliced GMP processor connected to the GMP block, and that operates in a time-sliced manner where the time-sliced GMP processor operates on each of the plurality of client signals, and wherein the time-sliced GMP processor is configured to perform a modified sigma-delta computation configured to determine data and stuff for a payload of each of the corresponding server signals. The plurality of client signals can be Ethernet and the corresponding server signal can be an optical transport network (OTN) signal.

20 Claims, 6 Drawing Sheets

(56) References Cited

U.S. PATENT DOCUMENTS

| | | | |
|---|---|---|---|
| 11,418,313 B1* | 8/2022 | Sluyski | H03M 13/2909 |
| 2013/0058643 A1* | 3/2013 | Honma | H04J 3/1652 |
| | | | 398/25 |
| 2015/0078752 A1* | 3/2015 | Wu | H04J 3/07 |
| | | | 398/98 |
| 2015/0295840 A1* | 10/2015 | Loehr | H04L 47/365 |
| | | | 398/68 |
| 2020/0235905 A1* | 7/2020 | Su | H04J 3/065 |
| 2020/0396050 A1 | 12/2020 | Perras et al. | |

FOREIGN PATENT DOCUMENTS

| | | | |
|---|---|---|---|
| CN | 117201434 A * | 12/2023 | |
| WO | WO-2017219979 A1 * | 12/2017 | H04J 3/16 |
| WO | 2021021474 A1 | 7/2020 | |
| WO | WO-2020147661 A1 * | 7/2020 | H04L 69/06 |

OTHER PUBLICATIONS

International Telecommunication Union, ITU-T, G.7041/Y.1303, "Generic framing procedure," Aug. 2016, pp. 1-80.

* cited by examiner

TIME-SLICED GMP MAPPING WITH MODIFIED SIGMA-DELTA MAPPING FUNCTION

FIELD OF THE DISCLOSURE

The present disclosure relates generally to networking. More particularly, the present disclosure relates to systems and methods for time-sliced generic mapping procedure (GMP) mapping.

BACKGROUND OF THE DISCLOSURE

Various network applications require circuitry for mapping one signal type into another signal type. For example, for illustration purposes, one such application includes mapping a gigabit Ethernet (GE) signal into the optical payload unit level 0 (OPU0) of an optical data unit level 0 (ODU0). The mapping requires computation to determine whether to include a data byte or to insert a stuff byte, to accommodate for rate differences, e.g., between the GE and the OPU0. An approach for this mapping is described in ITU-T G.709/Y.1331 (June 2020), entitled "Interfaces for the optical transport network," the contents of which are incorporated by reference in their entirety and hereinafter referred to as G.709. G.709 includes an Annex D entitled "Generic mapping procedure principles." GMP describes a sigma-delta data/stuff mapping distribution shown in G.709 Figure D.3.

There can be applications where a large number of client signals, e.g., GE, are mapped into server signals, e.g., ODU0, in a same circuit. For example, 80 or 82 GE signals can each be mapped to individual ODU0s which can then be mapped to higher level signals, e.g., ODU2, ODU4, etc. The mapping of ODU0s to ODU2 and/or ODU4 is defined and as specified in G.709. The present disclosure relates to the circuitry for mapping the individual client signals into ODU0s. In various descriptions herein, an example is presented of GE→ODU0, e.g., 80 or 82 GE to individual ODU0s in the same circuit. This can be a muxponder device in a network. A circuit, as described herein, can be a field programmable gate array (FPGA), an application specific integrated circuit (ASIC), etc. The circuit can also be referred to as a mapper/demapper (or simply a mapper which implies both mapping and demapping).

Previous implementations of the mapper required the use of 82 or 80 discrete full sigma-delta mapping (SDM) ODU0 GMP processors, with each processor operating on a 1-byte bus. When implemented in an FPGA using this approach, this mapper would require a large LUT (lookup table) count which would make it unfeasible to support a large number of channels (e.g., 80 or 82). One solution is to time-slice the GMP processor, i.e., have one GMP processor operator on all channels at different times, i.e., "time-sliced." If the processor were time-sliced, a full SDM function over a 40-byte bus would require 40 sequential accumulate/subtract operations per 350 MHz clock cycle. Also, implementing a generic 100 G time-sliced ODU0 GMP mapper would also be large and difficult to meet timing in an FPGA due to the wider data bus width and the 1-byte mapping nature of ODU0 GMP.

BRIEF SUMMARY OF THE DISCLOSURE

The present disclosure relates to systems and methods for time-sliced generic mapping procedure (GMP) mapping. In particular, the present disclosure includes a circuit for a mapper/demapper that includes a time-sliced GMP processor for mapping multiple clients into multiple servers along with a modified sigma-delta modulator function, to reduce computing resources across the multiple clients. This function allows greater flexibility in the processing of lower-rate signals in an FPGA architecture, as well as with ASIC implementation. An FPGA could handle a much higher number of GMP-mapped client signals as they are muxed into higher-rate signals. The savings in FPGA resources could be dedicated to adding other features or supported client types. This function may also have use in high-rate ASIC designs, where multiple SDM operations per clock cycle are needed to GMP map/demap any client signal whose block size is less than the datapath bus width. These could include, but are not limited to, lower-rate synchronous transport module (STM) and fibre channel signals, 40 GE, 100 GE, ODU4, and optical data unit—Cn (ODUCn) (in a flexible optical (FlexO) map/demap module). The reduction in logic by this function may lead to reduced power consumption for the ASIC design as well.

In an embodiment, a circuit includes an input configured to receive a plurality of client signals; a generic mapping procedure (GMP) block configured to map each of the plurality of client signals into a corresponding server signal; and a time-sliced GMP processor connected to the GMP block, and that operates in a time-sliced manner where the time-sliced GMP processor operates on each of the plurality of client signals, and wherein the time-sliced GMP processor is configured to perform a modified sigma-delta computation configured to determine data and stuff for a payload of each of the corresponding server signals. The plurality of client signals can be Ethernet and the corresponding server signal can be an optical transport network (OTN) signal. The circuit can include a generic framing procedure-transparent (GFP-T) mapping block between the input and the GMP block. The circuit can include an optical transport network (OTN) multiplexing block connected to the GMP block and configured to map the corresponding server signals into a higher order server signal.

The circuit can include a GMP block that has a size less than the data bus size for each of the plurality of client signals. The modified sigma-delta computation includes characterization of a pattern of the data and stuff for valid $C_m$ ranges of the client signal to the server signal, division of the data bus into subsections, and a determination of a stuff and location for each subsection. The modified sigma-delta computation can be based on G.709 annex D with the accumulator being incremented by a value based on a characterization of a pattern of the data and stuff for valid $C_m$ ranges of the client signal to the server signal as well as a width of the data bus. The GMP block can include time-sliced first-in-first-out (FIFO) buffers. The circuit can be a field programmable gate array (FPGA) or an application specific integrated circuit (ASIC).

In another embodiment, a method includes receiving a plurality of client signals; mapping each of the plurality of client signals into a corresponding server signal utilizing generic mapping procedure (GMP); and performing a modified sigma-delta computation configured to determine data and stuff for a payload of each of the corresponding server signals in the mapping step, and utilizing a time-sliced GMP processor that operates in a time-sliced manner where the time-sliced GMP processor operates on each of the plurality of client signals. The plurality of client signals can be Ethernet and the corresponding server signal can be an optical transport network (OTN) signal. The method can further include performing a generic framing procedure-transparent (GFP-T) mapping of the plurality of client signals prior to the mapping utilizing GMP. The method can further include performing optical transport network (OTN) multiplexing to map the corresponding server signals into a higher order server signal.

The method can be performed in a circuit with a GMP block that has a size less than the data bus size for each of the plurality of client signals. The modified sigma-delta computation includes characterizing a pattern of the data and stuff for valid $C_m$ ranges of the client signal to the server signal; dividing the data bus into subsections, and determining a stuff and location for each subsection. The modified sigma-delta computation can be based on G.709 annex D with the accumulator being incremented by a value based on a characterization of a pattern of the data and stuff for valid $C_m$ ranges of the client signal to the server signal as well as a width of the data bus. The GMP can utilize time-sliced first-in-first-out (FIFO) buffers. The method can be performed by a field programmable gate array (FPGA) or an application specific integrated circuit (ASIC).

BRIEF DESCRIPTION OF THE DRAWINGS

The present disclosure is illustrated and described herein with reference to the various drawings, in which like reference numbers are used to denote like system components/ method steps, as appropriate, and in which.

DETAILED DESCRIPTION OF THE DISCLOSURE

Again, the present disclosure relates to systems and methods for time-sliced generic mapping procedure (GMP) mapping. In particular, the present disclosure includes a circuit for a mapper/demapper that includes a time-sliced GMP processor for mapping multiple clients into multiple servers along with a modified sigma-delta modulator function, to reduce computing resources across the multiple clients. This function allows greater flexibility in the processing of lower-rate signals in an FPGA architecture, as well as with ASIC implementation. An FPGA could handle a much higher number of GMP-mapped client signals as they are muxed into higher-rate signals. The savings in FPGA resources could be dedicated to adding other features or supported client types. This function may also have use in high-rate ASIC designs, where multiple SDM operations per clock cycle are needed to GMP map/demap any client signal whose block size is less than the datapath bus width. These could include, but are not limited to, lower-rate synchronous transport module (STM) and fibre channel signals, 40 GE, 100 GE, ODU4, and optical data unit—Cn (ODUCn) (in a flexible optical (FlexO) map/demap module). The reduction in logic by this function may lead to reduced power consumption for the ASIC design as well.

In the following description, reference is made for illustration purposes to a time-sliced ODU0 GMP mapper that is optimized for mapping up to 82 1 GE clients into time-sliced ODU0's. It is used in a muxponder application in which up to 82 1 GE clients are generic framing procedure-transparent (GFP-T) mapped (GFP-T is described in ITU G.7041/ Y.1303 (August 2016), entitled "Generic framing procedure," the contents of which are incorporated by reference in their entirety and referred to as G.7041), then GMP mapped into ODU0s, and then multiplexed into an ODU4 via one or two levels of ODU payload type 21 (PT21) multiplexing. The present disclosure includes improvement in the GFP-T to GMP mapping step by sharing a GMP processor in a time-sliced manner between multiple clients and by modifying the SDM function to improve the computation. Those skilled in the art will recognize this is an example of client and server signals and other types of signals are also contemplated herewith.

GFP-T Mapping

For our example of GE to OPU0, GE is 8B/10B coded with a nominal bit rate of 1,250,000 kbit/s and a bit-rate tolerance up to ±100 ppm. Thus, GE does not directly fit in an OPU0 which has a nominal bit rate of 238/239×1,244,160 kbit/s±20 ppm. A GE (1000BASE-X signal) can be is synchronously mapped into a 75-octet GFP-T frame stream with a bit rate of 15/16×1,250,000 kbit/s±100 ppm (approximately 1,171,875 kbit/s±100 ppm). This process is referred to as "timing transparent transcoding (TTT)." This is described in G.709 clause 17.7.1.1.

GMP Mapping

Figure 1:
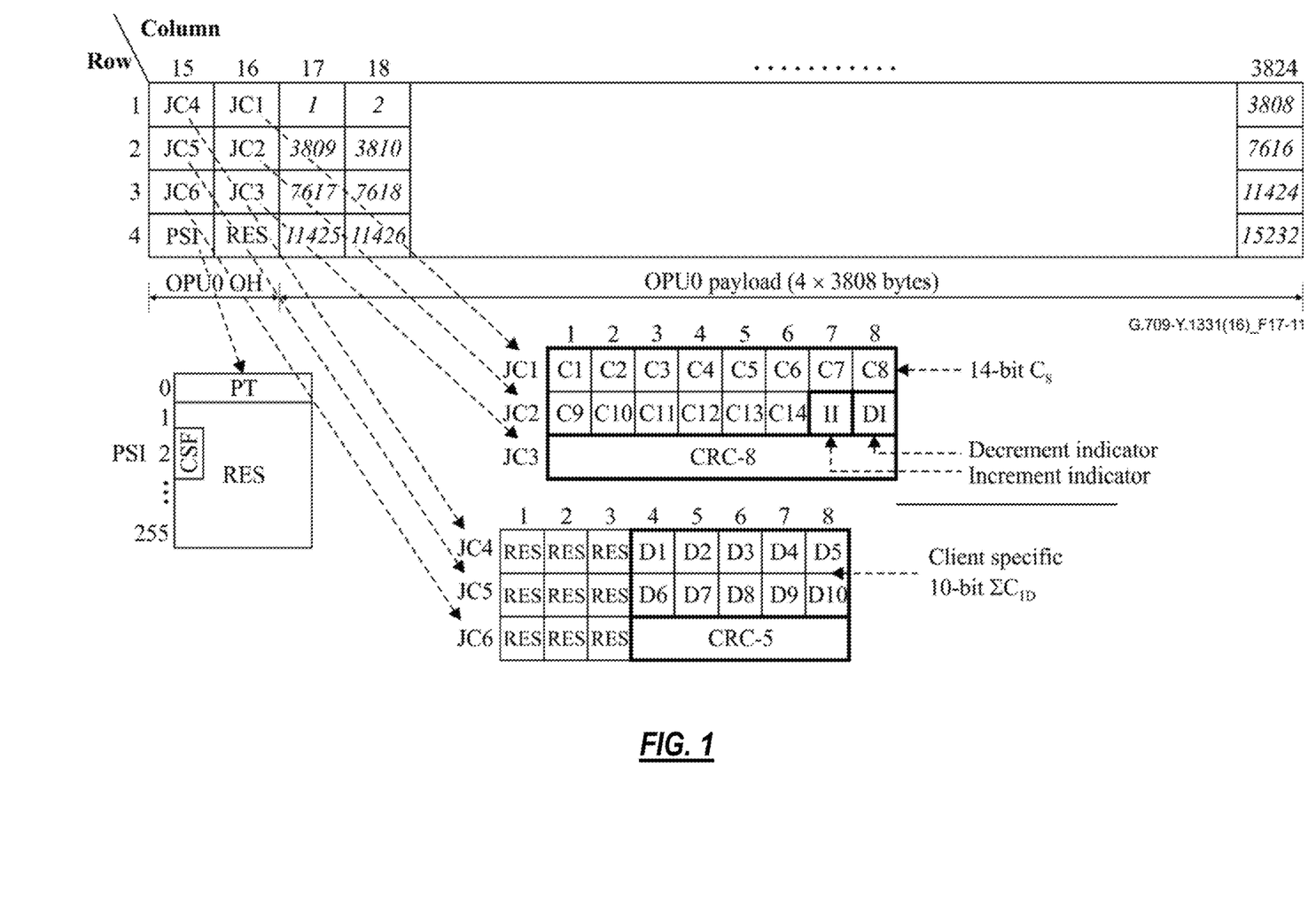
FIG. 1 is a diagram of an optical payload unit level 0 (OPU0) frame structure for the mapping of a sub-1.238 Gbit/s client signal, from FIG. 17-11 of G.709.

The 15/16×1,250,000 kbit/s±100 ppm signal is then mapped into an OPU0 by means of the generic mapping procedure as specified in G.709 clause 17.7.1 and Annex D. The OPU0 payload for this mapping includes 4×3808 bytes. The bytes in the OPU0 payload area are numbered from 1 to 15232. The OPU0 payload byte numbering for GMP 1-byte (8-bit) blocks is illustrated in FIG. 1. In row 1 of the OPU0 frame the first byte will be labelled 1, the next byte will be labelled 2, etc. Groups of eight successive bits (not necessary being a byte) of the client signal are mapped into a byte of the OPU0 payload area under control of the GMP data/stuff control mechanism. Each byte in the OPU0 payload area may either carry 8 client bits, or carry 8 stuff bits. The stuff bits are set to zero.

Figure 2:
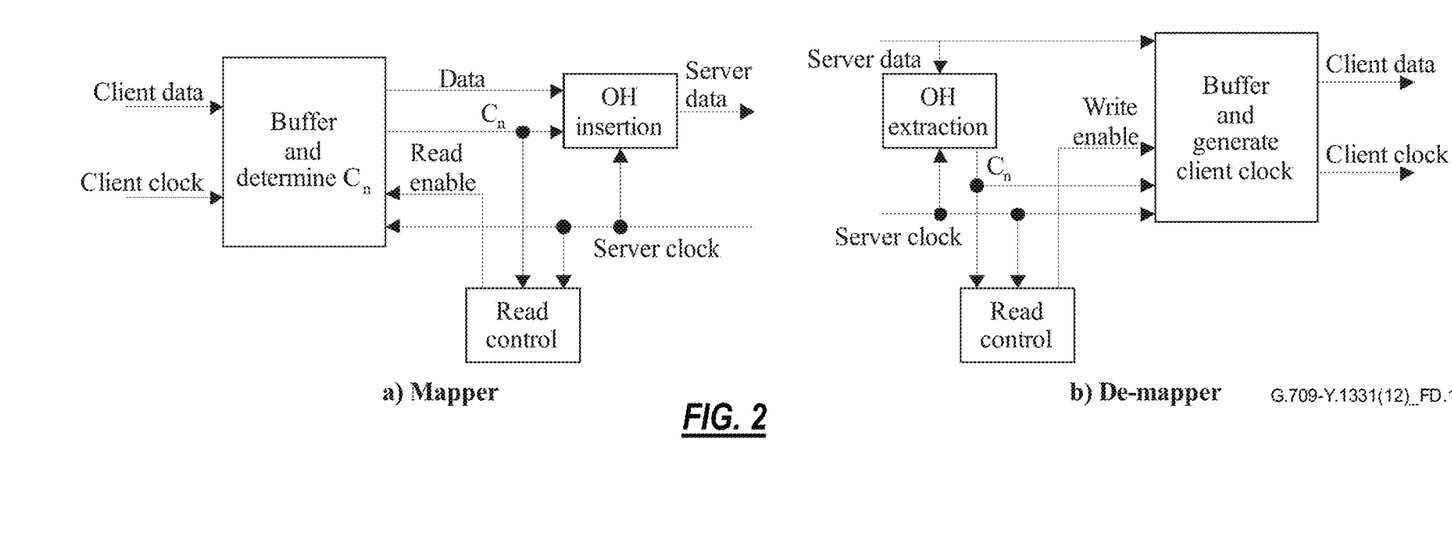
FIG. 2 is a diagram of generic functionality of a mapper/ demapper circuit, from G.709 Figure D.1.
Figure 3:
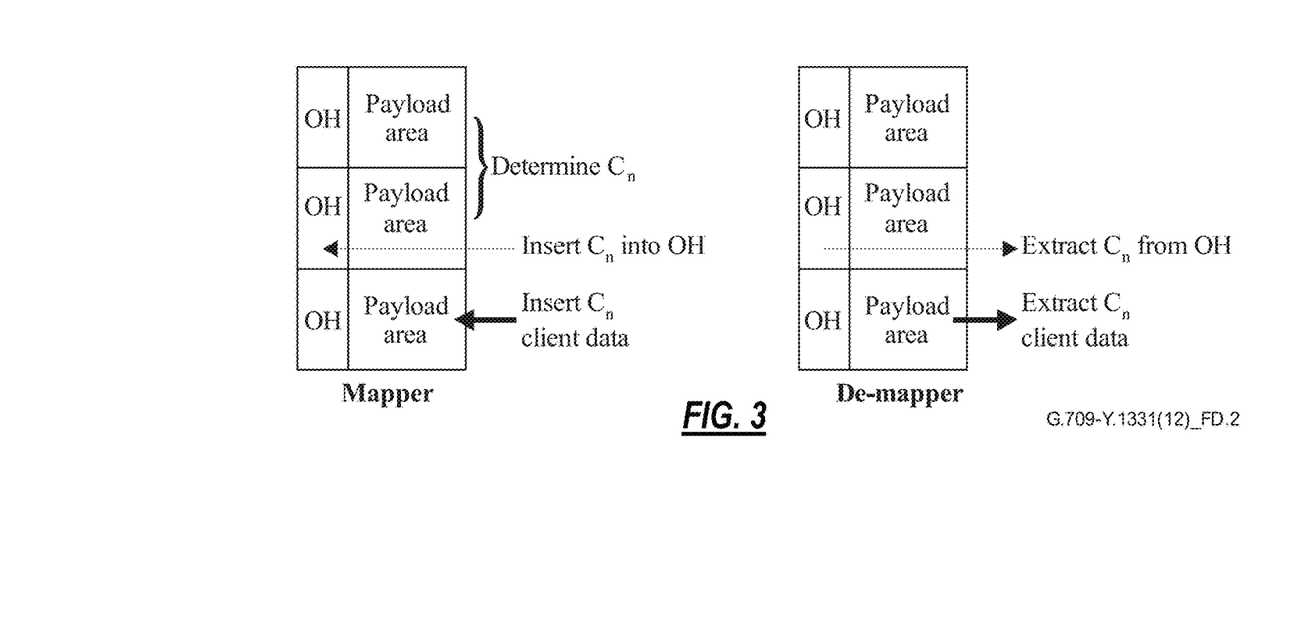
FIG. 3 is a diagram of the processing flow for the mapper/demapper circuit, from G.709 Figure D.2.

FIG. 2 is a diagram of generic functionality of a mapper/ demapper circuit, from G.709 Figure D.1. FIG. 3 is a diagram of the processing flow for the mapper/demapper circuit, from G.709 Figure D.2. As described herein, a client is the GFP-T mapped GE and a server is the ODU0, for example. The client and server bit rate are independent. This allows specifying the server bit rate independently from the client bit rates. Furthermore, client clock impairments are not seen at the server clock.

If the client or server bit rate changes due to client or server frequency tolerances, $c_n$ (number of client n-bit data entities per server frame or server multiframe) and $C_n(t)$ (number of client n-bit data entities per server frame t or server multiframe t (integer)) change accordingly. A special procedure has to take care that $C_n(t)$ is changed fast enough to the correct value during start-up or during a step in the client bit rate (e.g., when the client signal is replaced by its alarm indication signal (AIS) signal or the AIS signal is replaced by the client signal). This procedure may be designed to prevent buffer over-/underflow, or an additional buffer over-/underflow prevention method has to be deployed.

A transparent mapping has to determine $C_n(t)$ on a server (multi)frame per (multi)frame base. In order to extract the correct number of client information entities at the de-mapper, $C_n(t)$ has to be transported in the overhead area of the server frame or multiframe from the mapper to the de-mapper. FIG. 2 shows the generic functionality of the mapper and de-mapper circuit.

At the mapper, $C_n(t)$ is determined based on the client and server clocks. The client data is constantly written into the buffer memory. The read out is controlled by the value of $C_n(t)$. $C_n(t)$ has to be determined first, then it has to be inserted into the overhead and afterwards $C_n(t)$ client data entities have to be inserted into the payload area of the server as shown in FIG. 3. At the de-mapper, $C_n(t)$ is extracted from the overhead. $C_n(t)$ controls the write enable signal for the buffer. The client clock is generated based on the server clock and the value of $C_n(t)$. $C_n(t)$ is extracted from the overhead of the previous frame and used to extract $C_n(t)$ client data entities from the payload area of the server as shown in FIG. 3.

Figure 4:
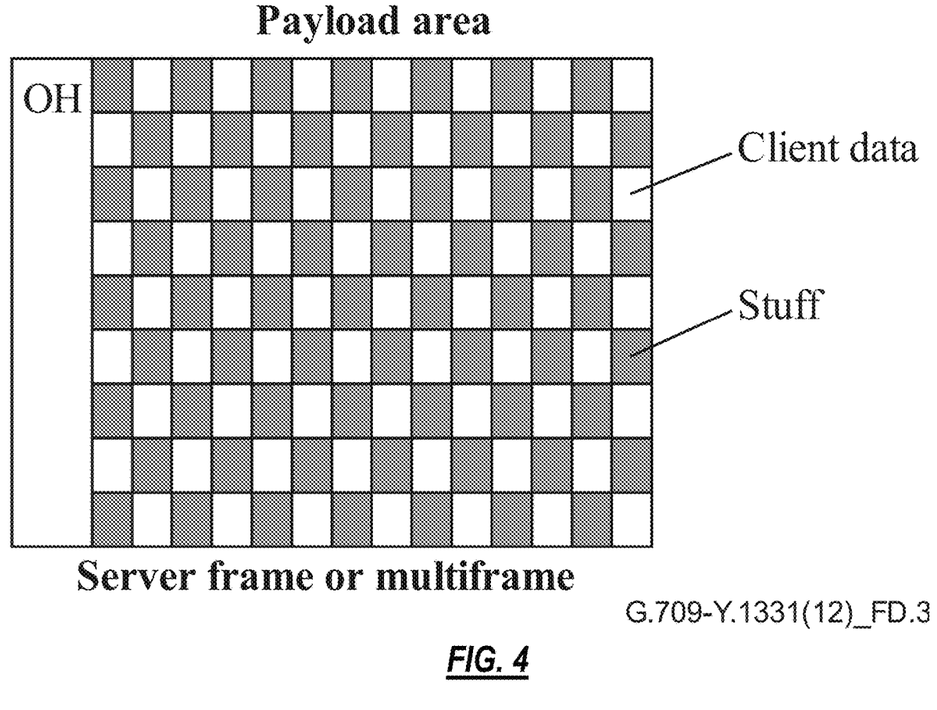
FIG. 4 is a diagram of sigma-delta based mapping, from G.709 Figure D.3.

$C_n(t)$ client data entities are mapped into the payload area of the server frame or multiframe using a sigma-delta data/stuff mapping distribution. It provides a distributed mapping as shown in FIG. 4. Payload field j (j=1 ... $P_{server}$) carries:

client data (D) if $(j \times C_n(t))$ mod $P_{server} < C_n(t)$     (D-10)

stuff (S) if $(j \times C_n(t))$ mod $P_{server} \geq C_n(t)$.     (D-11)

Where $P_{server}$ is the maximum number of (n bits) data entities in the server payload area.

$C_n(t)$ client data entities have to be distributed over $P_{server}$ locations. A client data entity has therefore to be inserted with a spacing of $$\frac{P_{server}}{C_n(t)}.$$

Figure 5:
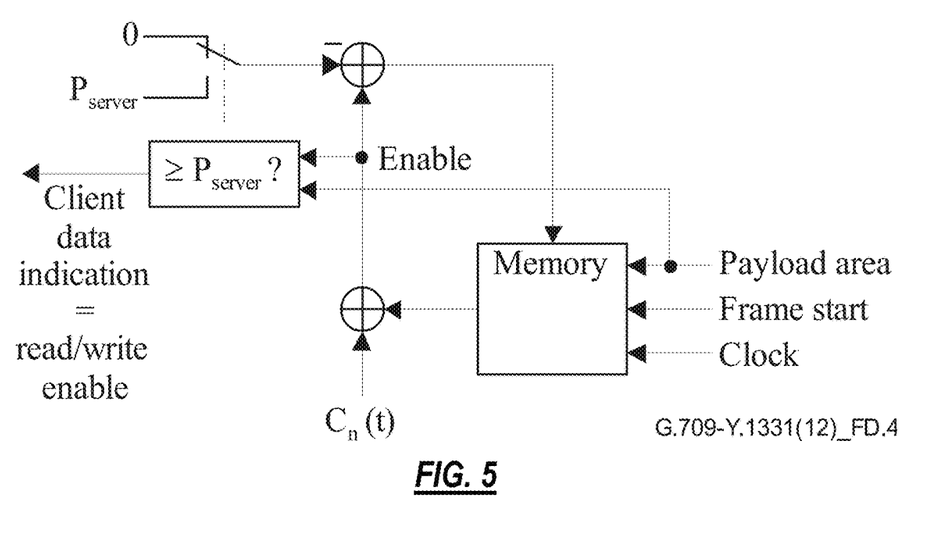
FIG. 5 is a diagram of a sigma-delta accumulator, from G.709 Figure D.4.

This is normally not an integer value, however it can be emulated by an integer calculation using the sigma-delta method based on an overflow accumulator as shown in FIG. 5. The accumulator memory is reset to 0 at every frame start of the server frame. At every location of the payload area, $C_n(t)$ is added to the memory and the result is compared with $P_{server}$. If the result is lower than $P_{server}$, it is stored back into the memory and no client data is indicated for this payload position. If it is equal or greater than $P_{server}$, $P_{server}$ is subtracted from the result and the new result is stored back in the memory. In addition, client data is indicated for the client position. As the same start value and $C_n(t)$ are used at the mapper and de-mapper the same results are obtained and interworking is achieved.

Apply GMP in OTN

G.709 Clauses 17.7, 19.6 and 20.5 specify GMP as the asynchronous generic mapping method for the mapping of CBR client signals into OPUk, the mapping of ODUk signals into a server OPUk (via the ODTUk.ts) and the mapping of ODUk signals into an OPUCn (via ODTUCn.ts). Asynchronous mappings in the OTN have a default 8-bit timing granularity. Such 8-bit timing granularity is supported in GMP by means of a $c_n$ with n=8 ($c_8$). The jitter/wander requirements for some of the OTN client signals are such that for those signals an 8-bit timing granularity may not be sufficient. For such a case, a 1-bit timing granularity is supported in GMP by means of $c_n$ with n=1 ($c_1$).

Apply GMP in OTN—M-Byte Granularity Mapping

G.709 Clauses 17.7 and 19.6 specify that the mapping of CBR client bits into the payload of an OPUk and the mapping of ODUj bits into the payload of an ODTUk.ts is performed with 8×M-bit (M-byte) granularity. The insertion of constant bit rate (CBR) client data into the payload area of the OPUk frame and the insertion of ODUj data into the payload area of the ODTUk.ts multiframe at the mapper is performed in M-byte (or m-bit, m=8×M) data entities, denoted as $C_m(t)$. The remaining $C_{nD}(t)$ data entities are signaled in the justification overhead as additional timing/phase information.

$$c_m = \left(\frac{n \times c_n}{m}\right) = \qquad \text{(D-12)}$$

$$\left(\frac{f_{client}}{f_{server}} \times \frac{B_{server}}{m}\right) = \left(\frac{f_{client}}{f_{server}} \times \frac{B_{server}}{8 \times M}\right) = \left(\frac{f_{client}}{f_{server}} \times \frac{B_{server}/8}{M}\right)$$

As only an integer number of m-bit data entities can be transported per server frame or multiframe, the integer value $C_m(t)$ of $c_m$ has to be used. Since it is required that no information is lost, the rounding process to the integer value has to take care of the truncated part, e.g., a $c_m$ with a value of 10.25 has to be represented by the integer sequence 10, 10, 10, 11.

$$C_m(t) = \text{int}(c_m) = \text{int}\left(\frac{f_{client}}{f_{server}} \times \frac{B_{server}/8}{M}\right) \qquad \text{(D-13)}$$

For the case $c_m$ is not an integer, $C_m(t)$ will vary between:

$$C_m(t) = \text{floor}\left(\frac{f_{client}}{f_{server}} \times \frac{B_{server}/8}{M}\right) \qquad \text{(D-14)}$$

$$\text{and } C_m(t) = \text{ceiling}\left(\frac{f_{client}}{f_{server}} \times \frac{B_{server}/8}{M}\right)$$

The remainder of $c_n$ and $C_m(t)$ is:

$$c_{nD} = c_n - \left(\frac{8 \times M}{n} \times C_m(t)\right) \qquad \text{(D-15)}$$

As only an integer number of $c_{nD}$ n-bit data entities can be signaled per server frame or multiframe, the integer value $C_{nD}(t)$ of $c_{nD}$ has to be used.

$$C_{nD}(t) = \text{int}(c_n) - \left(\frac{8 \times M}{n} \times C_m(t)\right) = C_n(t) - \left(\frac{8 \times M}{n} \times C_m(t)\right) \qquad \text{(D-16)}$$

$C_{nD}(t)$ is a number between $$1 - \frac{8 \times M}{n} \text{ and } \frac{8 \times M}{n} - 1.$$

As the client data has to fit into the payload area of the server signal, the maximum value of $C_m$ and as such the maximum client bit rate is limited by the size of the server payload area.

$$C_m(t) \leq P_{m,server} \quad \text{(D-22)}$$

$P_{m,server}$: maximum number of (m bits) data entities in the server payload area In order to extract the correct number of client information entities at the de-mapper, $C_m(t)$ has to be transported in the overhead area of the server frame or multiframe from the mapper to the de-mapper.

At the mapper, $C_n(t)$ is determined based on the client and server clocks. The client data is constantly written into the buffer memory. The read out is controlled by the value of $C_m(t)$.

At the de-mapper, $C_m(t)$ and $C_{nD}(t)$ are extracted from the overhead and used to compute $C_n(t)$. $C_m(t)$ controls the write enable signal for the buffer. The client clock is generated based on the server clock and the value of $C_n(t)$.

Figure 6:
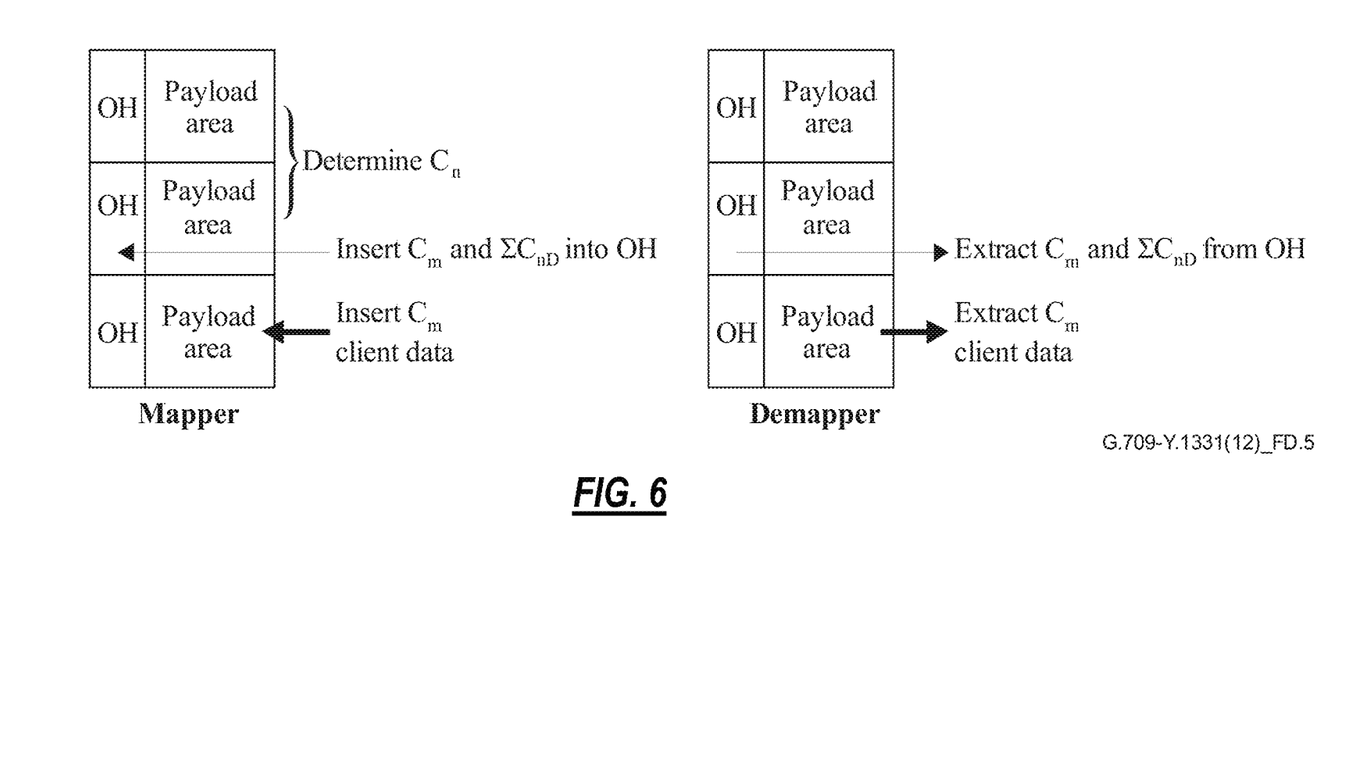
FIG. 6 is a diagram of the processing flow for GMP in OTN, from G.709 Figure D.5.

At the mapper, $C_n(t)$ has to be determined first, then it has to be inserted into the overhead as $C_m(t)$ and $\Sigma C_{nD}(t)$ and afterwards $C_m(t)$ client data entities have to be inserted into the payload area of the server as shown in FIG. 6. At the de-mapper, $C_m(t)$ is extracted from the overhead of the previous frame and used to extract $C_m(t)$ client data entities from the payload area of the server as shown in FIG. 6.

The $C_n(t)$ value determines the $C_m(t)$ and $C_{nD}(t)$ values; $C_m(t)=\text{floor } (n/m \times C_n(t))$ and $C_{nD}(t)=C_n(t)-(m/n \times C_m(t))$. The values of $C_{nD}(t)$ are accumulated and if $\Sigma C_{nD}(t) \geq m/n$ then m/n is subtracted from $\Sigma C_{nD}(t)$ and $C_m(t)$ is incremented with +1. These latter two values are then encoded in the overhead bytes. This $C_m(t)$ value is applied as input to the sigma-delta process.

During start-up or during a step in the client bit rate, the value of $C_n(t)$ will not match the actual number of n-bit client data entities arriving at the mapper buffer and the $C_n(t)$ determination process has to adjust its value to the actual number of n-bit client data entities arriving. This adjustment method is implementation specific. During the mismatch period, the mapper buffer fill level may increase if more n-bit client data entities arrive per multiframe than there are transmitted, or decrease if less n-bit client data entities arrive per multiframe than there are transmitted.

To prevent overflow or underflow of the mapper buffer and thus data loss, the fill level of the mapper buffer has to be monitored. For the case where too many m-bit client data entities are in the buffer, it is necessary to insert temporarily more m-bit client data entities in the server (multi)frame(s) than required by $C_n(t)$. For the case too few m-bit client data entities are in the buffer, it is necessary to insert temporarily fewer m-bit client data entities in the server (multi)frame(s) than required by $C_n(t)$.

The OTN supports a number of client signal types for which transfer delay (latency) and transfer delay variation are critical parameters. Those client signal types require that the transfer delay introduced by the mapper plus de-mapper buffers is minimized and that the delay variation introduced by the mapper plus de-mapper buffers is minimized.

In steady state periods, $C_n(t)$ is a value in the range $C_{n,min}$ to $C_{n,max}$. A value outside this range indicates that there is a misalignment of the expected client bit rate and the actual client bit rate. During transient periods after e.g., a frequency step, $C_n(t)$ may be temporarily outside the range $C_{n,min}$ to $C_{n,max}$.

$C_m(t)$ client data entities are mapped into the payload area of the server frame or multiframe using a sigma-delta data/stuff mapping distribution. It provides a distributed mapping as shown in FIG. 4. Payload field j (j=1 . . . $P_{m,server}$) carries client data (D) if $(j \times C_m(t)) \mod P_{m,server} < C_m(t)$; (D-23)

stuff (S) if $(j \times C_m(t)) \mod P_{m,server} \geq C_m(t)$. (D-24)

Disadvantage of GMP Processing

Again, in a single circuit where there are multiple clients and servers, this mapper would require a large LUT (lookup table) count which would make it unfeasible to support 82 channels. Also, implementing a generic 100 G time-sliced ODU0 GMP mapper would also be large and difficult to meet timing in an FPGA due to the wider data bus width and the 1-byte mapping nature of ODU0 GMP.

Time-Sliced GMP Processor and Modified SDM Functions

The present disclosure includes a circuit that supports multiple clients for mapping into servers, and optionally for multiplexing the multiple servers into a single signal. For example, multiple GEs mapped to ODU0 and the ODU0s ultimately mapped to an ODUk, e.g., ODU2, ODU4, ODUCn, etc. The circuit includes a time-sliced architecture for mapping the multiple clients into the servers. Note, the terms "clients" and "servers" respectively mean client signals and server signals. The time-sliced architecture allows a single GMP processor for mapping the multiple clients into the servers where each client gets a time-slice. Further, to support the time-sliced architecture which means reduce processing for each client, the present disclosure includes a modification to the SDM function that means the data/stuff byte computation is not performed for every byte, but rather only as required based on the application.

Mapper/Demapper Circuit

Figure 7:
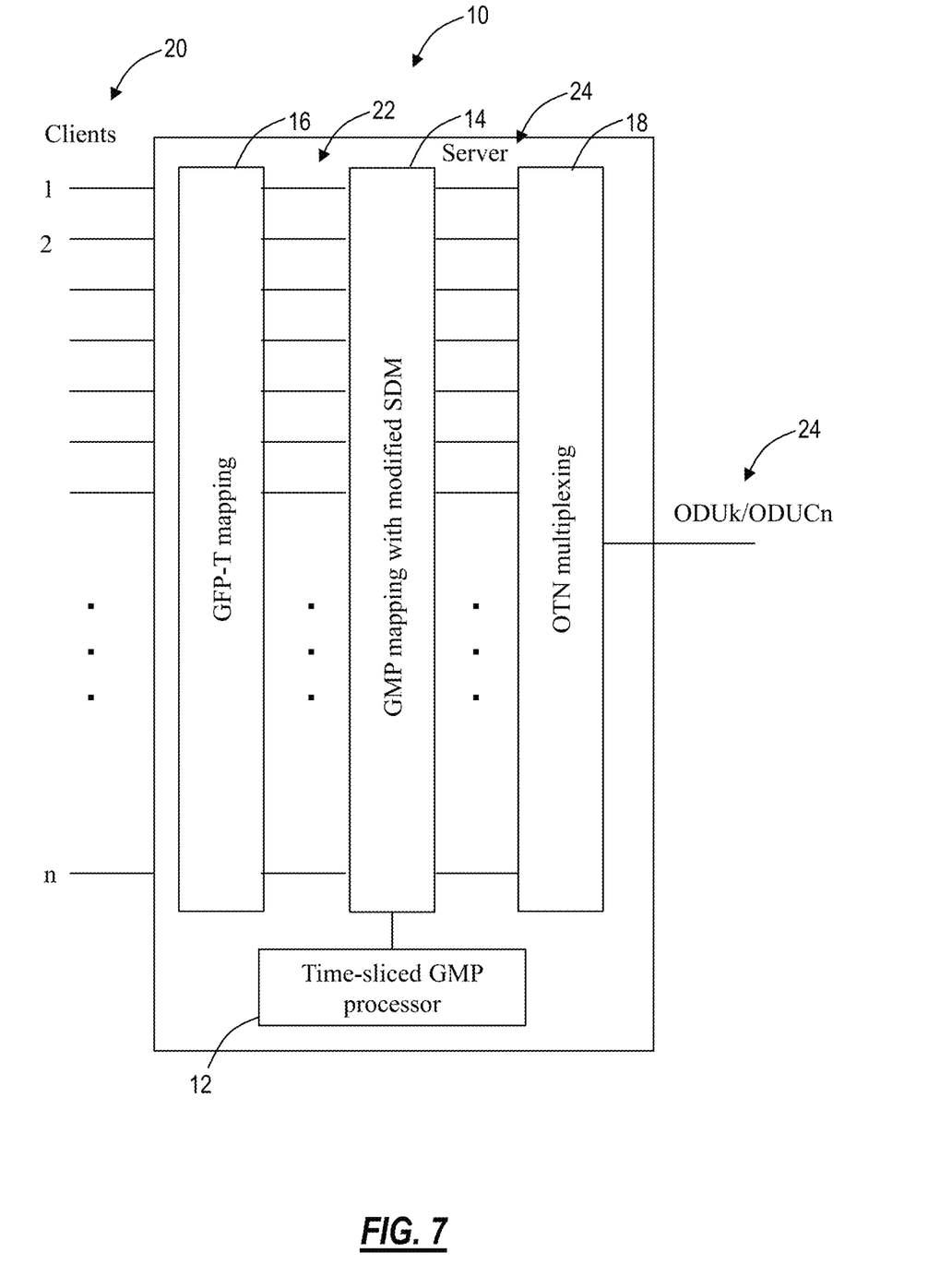
FIG. 7 is a block diagram of a circuit that includes a time-sliced GMP processor and GMP mapping with a modification to the SDM function.

FIG. 7 is a block diagram of a circuit 10 that includes a time-sliced GMP processor 12 and GMP mapping 14 with a modification to the SDM function. Also, the circuit 10 can include GFP-T mapping 16 and OTN multiplexing 18. The circuit 10 includes inputs from n client signals 20, n is an integer. Again, for example, the client signals 20 can be 80 or 82 GE signals. Collectivity, the time-sliced GMP processor 12, the GMP mapping 14, the GFP-T mapping 16, and the OTN multiplexing 18 are logical functions implemented in the circuit 10. The circuit 10 can be an FPGA, an ASIC, etc. The time-sliced GMP processor 12 reduces the processing required. Note, without a shared or time-sliced GMP processor 12, there would be a need for n GMP processors 12, taking a significant amount of real estate in the circuit. The modification to the SDM function is required to meeting timing requirements, such as in an FPGA or ASIC clocked at 350 MHz.

The GFP-T mapping 16 can map individual client signals 16 into a GFP-T frame stream 22, such as described in G.7041. As noted herein, for GE, this includes transcoding a 1.250 Gb/s signal by 15/16.

The GMP mapping 14 is configured to perform GMP mapping as described in G.709 Annex D with the time-sliced GMP processor 12 and a modification to the SDM function described herein. The GMP mapping 14 is configured to map either the client signals 20 or the GFP-T frame stream 22 with the client signals 20 into server signals 24. Again, for example, GE into ODU0s.

The OTN multiplexing 18 is configured to multiplex the n server signals 24 into a higher order signal 26, such as via one or two levels of ODU payload type 21 (PT21) multiplexing. Again, for example, 80 or 82 ODU0s into an ODU4 or ODUC1.

The circuit 10 contemplates use in a muxponder application—multiple client interfaces, for the client signals 20, and one line interfaces for the higher order signal 26.

In an embodiment, the circuit 10 includes an input configured to receive a plurality of client signals; a generic mapping procedure (GMP) block configured to map each of the plurality of client signals into a corresponding server signal; and a time-sliced GMP processor connected to the GMP block, and that operates in a time-sliced manner where the time-sliced GMP processor operates on each of the plurality of client signals, and wherein the time-sliced GMP processor is configured to perform a modified sigma-delta computation configured to determine data and stuff for a payload of each of the corresponding server signals.

The plurality of client signals can be Ethernet and the corresponding server signal can be an optical transport network (OTN) signal. The circuit 10 can further include a generic framing procedure-transparent (GFP-T) mapping block between the input and the GMP block. The circuit 10 can further include an optical transport network (OTN) multiplexing block connected to the GMP block and configured to map the corresponding server signals into a higher order server signal.

The circuit 10 includes a GMP block that has a size less than the data bus size for each of the plurality of client signals. The modified sigma-delta computation can include characterization of a pattern of the data and stuff for valid $C_m$ ranges of the client signal to the server signal, division of the data bus into subsections, and a determination of a stuff and location for each subsection. The modified sigma-delta computation can be based on G.709 annex D with $C_m$ being incremented by a value based on a characterization of a pattern of the data and stuff for valid $C_m$ ranges of the client signal to the server signal. The GMP block can include time-sliced first-in-first-out (FIFO) buffers. The circuit can be a field programmable gate array (FPGA) or an application specific integrated circuit (ASIC).

Modified SDM Function

The modified SDM function is performed by the time-sliced GMP processor 12 on a per client signal 20 basis, depending on which client signal 12 is being analyzed in a given time slice. The first step in the modified SDM function is to characterize the data/stuff patterns based on the valid $C_m(t)$ range of the application.

For example, the following table shows example $C_m(t)$ ranges for example client signals 20 into an OPU0 (for an ODU0). This table is from G.709 (February 2012).

TABLE 17-4A

Cm (m = 8) for sub-1.238G clients into OPU0

| Client signal | Nominal bit rate (kbit/s) | Bit rate tolerance (ppm) | Floor $C_{8, min}$ (Note) | Minimum $C_8$ | Nominal $C_8$ | Maximum $C_8$ | Ceiling $C_{8, max}$ (Note) |
|---|---|---|---|---|---|---|---|
| Transcoded 1000BASE-X (see clause 17.7.1.1) | 15/16 × 1 250 000 | ±100 | 14405 | 14405.582 | 14407.311 | 14409.040 | 14410 |
| STM-1 | 155 520 | ±20 | 1911 | 1911.924 | 1912.000 | 1912.076 | 1913 |
| STM-4 | 622 080 | ±20 | 7647 | 7647.694 | 7648.000 | 7648.306 | 7649 |
| FC-100 | 1 062 500 | ±100 | 13061 | 13061.061 | 13062.629 | 13064.196 | 13065 |
| SBCON/ESCON | 200 000 | ±200 | 2458 | 2458.307 | 2458.848 | 2459.389 | 2460 |
| DVB-ASI | 270 000 | ±100 | 3319 | 3319.046 | 3319.444 | 3319.843 | 3320 |
| SDI | 270 000 | ±2.8 | 3319 | 3319.369 | 3319.444 | 3319.520 | 3320 |

(Note)
Floor $C_{m, min}$ (m = 8) and Ceiling $C_{m, max}$ (m = 8) values represent the boundaries of client/OPU ppm offset combinations (i.e., min. client/max. OPU and max. client/min. OPU). In steady state, given instances of client/OPU offset combinations should not result in generated $C_m$ values throughout this range but rather should be within as small a range as possible. Under transient ppm offset conditions (e.g., AIS to normal signal), it is possible that $C_m$ values outside the range $C_{m, min}$ to $C_{m, max}$ may be generated and a GMP de-mapper should be tolerant of such occurrences. Refer to Annex D for a general description of the GMP principles.

In the case of GE, the valid $C_m(t)$ range is 14405-14410. With the $C_m(t)$ range, it was determined that on a 40-byte bus of a padded ODU0 frame (each ODU0 row has 3840 bytes), data busses with overhead data or padding will only have 1 or 2 stuff bytes, and on data busses with no overhead, only 2 or 3 stuff bytes. The ratio of $P_{m,server}$ to stuff bytes of GE is ~18.418-18.530. This falls within the bounds of 13.33-20 for a 40-byte bus, and 12-24 for a 24-byte bus. A selector was used to determine how much data is needed for a given GMP-mapped cycle, instead of a full, 40-byte/40-step sequential sigma-delta modulator (SDM) calculation.

Specifically, the modified SDM function includes pre-computing the known data/stuff patterns of 1 GE Cm values to compute the correct next state of the SDM accumulator by adding 40× (or 24× in the case of an overhead or padded bus cycle) the Cm value to the current state of the accumulator, and comparing that result with the expected state of the accumulator, before the modulus function, when either 2 or 3 (or 1 or 2 in the case of an overhead or padded bus cycle) stuff bytes are present. As noted above, the conventional SDM function performs a computation for each Payload field j (j=1 ... $P_{m,server}$) that includes $$\text{client data } (D) \text{ if } (j \times C_m(t)) \bmod P_{m,server} < C_m(t); \quad (D\text{-}23)$$

$$\text{stuff } (S) \text{ if } (j \times C_m(t)) \bmod P_{m,server} \geq C_m(t). \quad (D\text{-}24)$$

The present disclosure does not perform this computation for j=1 ... $P_{m,server}$. Rather, the various of j is incremented by 40 (or 24 in the case of an overhead or padded bus cycle), one increment for each payload field on the given data bus. This means the SDM computation (equations D-23, D-24) are not performed for every payload field, but for every $40^{th}$ (or $24^{th}$). 40 payload field bytes for a non-overhead/padded data bus, 24 payload field bytes for an overhead/padded data bus, corresponding to the number of times j increments This led to the feature of a fast data-request decision to interface with a time-sliced first-in-first-out (FIFO) in the GMP mapping 14. Typically, time-sliced FIFOs have a greater request latency than standard random-access memory (RAM) read latencies. While the function is waiting for data from the FIFO to arrive, the function is computing the mapping of data/stuff locations on the current data bus. This reduces the overall latency of getting data into the ODU0 frame and reduces the FPGA resources used. The number of bytes of data requested from the time-sliced FIFO is 5 possibilities (0, 22, 23, 37, or 38) for the GMP mapper—no data, 24 potential data fields—2 stuff bytes, 24 potential data fields—1 stuff byte, 40 potential data fields—3 stuff bytes, 40 potential data fields—2 stuff bytes. Similarly, the number of bytes of data written to a data buffer is 5 possibilities (0, 22, 23, 37, or 38) for the GMP demapper.

Once the data is requested, the mapping function divides an unpacked data bus into subsections such that only 1 stuff byte can be present per each subsection, and partial SDM accumulators on each subsection determine if a subsection contains a stuff byte. The characterization of the data/stuff patterns allows for resource optimization by only accounting for stuff bytes on certain subsections of the data bus. The correct starting SDM accumulator state is calculated for each subsection of the data bus. To compute if a stuff byte is located on a subsection, derived multiples (n) of the Cm value are independently added to the starting state of the SDM accumulator. If the subsection starting SDM accumulator value+n×Cm is less than n×Pm,server, the subsection contains a stuff byte. The results of each subsection's addition are compared to expected states of the accumulator, before modulus function, if a stuff byte was present in that subsection. The function then determines which byte of a subsection, if any, contains the stuff byte—a process pipelined into 4 stages to ensure the design meets the 350 MHz FPGA timing requirement. To compute where the stuff bytes are located on the subsection, pipelined normal 1-step SDM accumulator operations are used within each subsection.

The received time-sliced client 1 GE data is then distributed to the unpacked data bus subsections based on where the stuff bytes were detected for that data bus GMP mapping cycle. Per each subsection, the data is shifted to make space for any stuff locations. Each subsection has sequential, pipelined SDM calculations performed to determine where any stuff bytes occur within that subsection of the data bus. The group of subsection calculations are done in parallel with one another.

In the GMP demapping function, the same data/stuff location characterization is used to compute partial SDM accumulators on data bus subsections, detect which subsections contain stuff bytes, then in each subsection, determine the location of any stuff byte. This process is also pipelined to meet the FPGA timing requirements. Once the data/stuff bytes are located, data bytes and crunched (stuff bytes removed) on the bus in a multi-stage algorithm and written to storage memory.

While this GMP map/demap function is targeted for 1 GE clients on a 40-byte bus with a pattern of data/stuff bytes, this approach can be used for any situation where the GMP block size is less than the datapath bus width. Even if no data/stuff pattern can be extracted, a similar group of selectors can be used to determine how many stuff blocks exist on a given databus, as well as where those stuff blocks are located, in a pipelined architecture. This would reduce the needed logic in both FPGA and ASIC designs.

Process

Figure 8:
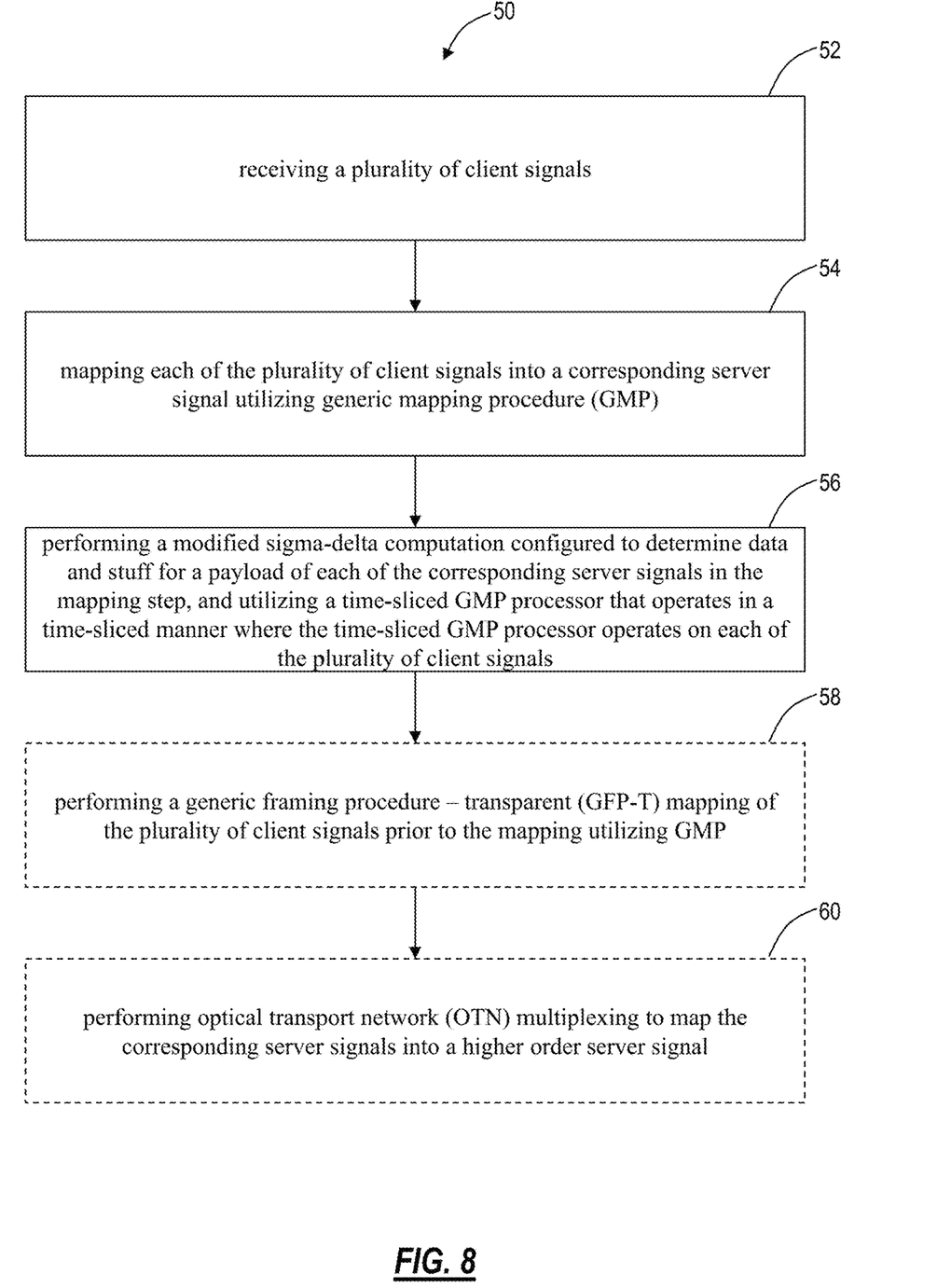
FIG. 8 is a flowchart of a process implemented by a circuit for time-sliced generic mapping procedure (GMP) mapping.

FIG. 8 is a flowchart of a process 50 implemented by a circuit for time-sliced generic mapping procedure (GMP) mapping. The process 50 includes receiving a plurality of client signals (step 52); mapping each of the plurality of client signals into a corresponding server signal utilizing generic mapping procedure (GMP) (step 54); and performing a modified sigma-delta computation configured to determine data and stuff for a payload of each of the corresponding server signals in the mapping step, and utilizing a time-sliced GMP processor that operates in a time-sliced manner where the time-sliced GMP processor operates on each of the plurality of client signals (step 56). The plurality of client signals can be Ethernet and the corresponding server signal can be an optical transport network (OTN) signal.

The process 50 can further include performing a generic framing procedure-transparent (GFP-T) mapping of the plurality of client signals prior to the mapping utilizing GMP (step 58). The process 50 can further include performing optical transport network (OTN) multiplexing to map the corresponding server signals into a higher order server signal (step 60).

The circuit includes a GMP block that has a size less than the data bus size for each of the plurality of client signals. The modified sigma-delta computation can include characterizing a pattern of the data and stuff for valid $C_m$ ranges of the client signal to the server signal; dividing the data bus into subsections, and determining a stuff and location for each subsection. The modified sigma-delta computation can be based on G.709 annex D with the accumulator being incremented by a value based on a characterization of a pattern of the data and stuff for valid $C_m$ ranges of the client signal to the server signal as well as the width of the data bus.

The GMP can utilize time-sliced first-in-first-out (FIFO) buffers. The process 50 can be performed by a field programmable gate array (FPGA) or an application specific integrated circuit (ASIC).

Conclusion

It will be appreciated that some embodiments described herein may include one or more generic or specialized processors ("one or more processors") such as microprocessors; central processing units (CPUs); digital signal processors (DSPs): customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a read-only memory (ROM), a programmable read-only memory (PROM), an erasable programmable read-only memory (EPROM), an electrically erasable programmable read-only memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. The foregoing sections include headers for various embodiments and those skilled in the art will appreciate these various embodiments may be used in combination with one another as well as individually.

What is claimed is:

1. A circuit comprising:
    an input configured to receive a plurality of client signals;
    a generic mapping procedure (GMP) block configured to map each of the plurality of client signals into a corresponding server signal; and
    a time-sliced GMP processor connected to the GMP block, and that operates in a time-sliced manner where the time-sliced GMP processor operates on each of the plurality of client signals, and wherein the time-sliced GMP processor is configured to perform a modified sigma-delta computation configured to determine data and stuff for a payload of each of the corresponding server signals,
    wherein the time-sliced GMP processor determines the data and stuff for all of the plurality of client signals, and wherein the modified sigma-delta computation includes (1) characterization of the data and stuff based on a type of the plurality of client signals, (2) computation of a correct next state of an accumulator using the characterization, and (3) a comparison of the correct next state with a current state to determine the data and stuff.

2. The circuit of claim 1, wherein the plurality of client signals are Ethernet and the corresponding server signal is an optical transport network (OTN) signal.

3. The circuit of claim 1, further comprising
    a generic framing procedure-transparent (GFP-T) mapping block between the input and the GMP block.

4. The circuit of claim 1, further comprising
    an optical transport network (OTN) multiplexing block connected to the GMP block and configured to map the corresponding server signals into a higher order server signal.

5. The circuit of claim 1, wherein the GMP block has a size less than a size of a data bus for each of the plurality of client signals.

6. The circuit of claim 1, wherein the modified sigma-delta computation is based on G.709 annex D with the accumulator being incremented by a value based on a characterization of a pattern of the data and stuff for valid Cm ranges of the client signal to the server signal as well as a width of the data bus.

7. The circuit of claim 1, wherein the GMP block includes time-sliced first-in-first-out (FIFO) buffers.

8. The circuit of claim 1, wherein the circuit is a field programmable gate array (FPGA).

9. The circuit of claim 1, wherein the circuit is an application specific integrated circuit (ASIC).

10. The circuit of claim 1, wherein the time-sliced GMP processor has reduced processing for each client relative to each client having a dedicated GMP processor, and the modified sigma-delta computation limits the data and stuff based on the type of the plurality of client signals, thereby supporting the reduced processing.

11. A method comprising steps of:
    receiving a plurality of client signals;
    mapping each of the plurality of client signals into a corresponding server signal utilizing generic mapping procedure (GMP); and
    performing a modified sigma-delta computation configured to determine data and stuff for a payload of each of the corresponding server signals in the mapping step, and utilizing a time-sliced GMP processor that operates in a time-sliced manner where the time-sliced GMP processor operates on each of the plurality of client signals,
    wherein the time-sliced GMP processor determines the data and stuff for all of the plurality of client signals, and wherein the modified sigma-delta computation includes (1) characterization of the data and stuff based on a type of the plurality of client signals, (2) computation of a correct next state of an accumulator using the characterization, and (3) a comparison of the correct next state with a current state to determine the data and stuff.

12. The method of claim 11, wherein the plurality of client signals are Ethernet and the corresponding server signal is an optical transport network (OTN) signal.

13. The method of claim 11, wherein the steps further include
    performing a generic framing procedure-transparent (GFP-T) mapping of the plurality of client signals prior to the mapping utilizing GMP.

14. The method of claim 11, wherein the steps further include
    performing optical transport network (OTN) multiplexing to map the corresponding server signals into a higher order server signal.

15. The method of claim 11, wherein the method is implemented in a circuit with a GMP block that has a size less than a size of a data bus for each of the plurality of client signals.

16. The method of claim 11, wherein the modified sigma-delta computation is based on G.709 annex D with the accumulator being incremented by a value based on a characterization of a pattern of the data and stuff for valid Cm ranges of the client signal to the server signal as well as a width of the data bus.

17. The method of claim 11, wherein the GMP utilizes time-sliced first-in-first-out (FIFO) buffers.

18. The method of claim 11, wherein the method is performed by a field programmable gate array (FPGA).

19. The method of claim 11, wherein the method is performed by an application specific integrated circuit (ASIC).

20. The method of claim 11, wherein the time-sliced GMP processor has reduced processing for each client relative to each client having a dedicated GMP processor, and the modified sigma-delta computation limits the data and stuff based on the type of the plurality of client signals, thereby supporting the reduced processing.

\* \* \* \* \*